United States Patent
Boerstoel et al.

(10) Patent No.: US 8,501,071 B2
(45) Date of Patent: Aug. 6, 2013

(54) METHOD FOR OBTAINING HIGH-TENACITY ARAMID YARN

(75) Inventors: Hanneke Boerstoel, Arnhem (NL);
Johannes Bos, Apeldoorn (NL);
Adriaan Anton Schaap, Oosterbeek (NL); Dennis Wilbers, Iwakuni (JP);
Leonardus Antonius Godfried Busscher, Duiven (NL); Antonius Henricus Maria Schotman, Huissen (NL); Kurt Rainer Hans-Heinrich Stolze, Leichlingen (DE)

(73) Assignee: Teijin Aramid B.V., Arnhem (NL)

( * ) Notice: Subject to any disclaimer, the term of this patent is extended or adjusted under 35 U.S.C. 154(b) by 394 days.

(21) Appl. No.: 12/311,654

(22) PCT Filed: Nov. 19, 2007

(86) PCT No.: PCT/EP2007/009901
§ 371 (c)(1),
(2), (4) Date: Apr. 8, 2009

(87) PCT Pub. No.: WO2008/061668
PCT Pub. Date: May 29, 2008

(65) Prior Publication Data
US 2010/0001433 A1 Jan. 7, 2010

(30) Foreign Application Priority Data
Nov. 21, 2006 (EP) .................................... 06024104

(51) Int. Cl.
*D01F 6/00* (2006.01)
*D01F 6/905* (2006.01)

(52) U.S. Cl.
USPC ......... 264/291; 264/176.1; 264/184; 264/234

(58) Field of Classification Search
USPC ............................ 264/176.1, 184, 234, 291
See application file for complete search history.

(56) References Cited

U.S. PATENT DOCUMENTS

| 3,227,793 | A | * | 1/1966 | Cipriani | 264/203 |
| 3,414,645 | A | * | 12/1968 | Morgan, Jr. | 264/184 |
| 3,767,756 | A | * | 10/1973 | Blades | 264/184 |
| 3,869,429 | A | * | 3/1975 | Blades | 528/341 |
| 4,018,735 | A | | 4/1977 | Nakagawa et al. | |
| 4,172,938 | A | | 10/1979 | Mera et al. | |
| 4,883,634 | A | * | 11/1989 | Chern et al. | 264/555 |
| 5,175,239 | A | * | 12/1992 | Gauntt et al. | 528/348 |
| 5,571,891 | A | | 11/1996 | Jung et al. | |
| 5,646,234 | A | | 7/1997 | Jung et al. | |
| 5,667,743 | A | * | 9/1997 | Tai et al. | 264/184 |
| 2007/0083032 | A1 | * | 4/2007 | Bos | 528/310 |
| 2010/0029159 | A1 | * | 2/2010 | Ishihara et al. | 442/301 |
| 2013/0075950 | A1 | * | 3/2013 | Knoff et al. | 264/184 |

FOREIGN PATENT DOCUMENTS

| CN | 1473969 A | | 2/2004 |
| RU | 2 017 866 C1 | | 8/1994 |
| RU | 2017866 C1 | | 8/1994 |
| RU | 2 045 586 C1 | | 10/1995 |
| RU | 2045586 | * | 10/1995 |
| RU | 2045586 CI | | 10/1995 |
| RU | 2285761 C1 | | 10/2006 |
| WO | WO 2005/054337 A1 | | 6/2005 |
| WO | WO 2006/045517 A1 | | 5/2006 |
| WO | WO 2008/061668 A1 | | 5/2008 |

OTHER PUBLICATIONS

Sugak et al., "Fabrication of Fibres from Sulfuric Acid Solutions of Copolyamides Containing Polyamide-Benzimidazole Units and their Heat Treatment," *Fibre Chemistry,* vol. 31, No. 1, 1999, pp. 8-13.
Yang, *Kevlar Aramid Fiber,* 1992, pp. 34-35.
V.N. Sugak et al., "Fabrication of Fibres From Sulfuric Acid Solutions of Copolyamides Containing Polyamide-Benzimidazole Units and Their Heat Treatment," Fibre Chemistry, vol. 31, No. 1, pp. 8-13, 1999.
A.N. Gladkov et al., "Chemistry and Technology of Chemical Fibres," Fibre Chemistry, vol. 36, No. 3, pp. 177-180, 2004.
J.W.S. Hearle, High-Performance Fibres, 2004, cover pages (5) and pp. 115-118.

* cited by examiner

*Primary Examiner* — Milton I Cano
*Assistant Examiner* — Jeremiah Smith
(74) *Attorney, Agent, or Firm* — Oliff & Berridge, PLC

(57) ABSTRACT

The invention relates to a method for obtaining high-tenacity aramid yarn, wherein the yarn is made of a copolymer obtained from a mixture of monomers comprising DAPBI, an aromatic para-diamine, and an aromatic para-diacid, wherein the yarn is heated in at least two process steps, characterized in that in a first step the yarn is heated at a temperature of 200 to 360° C. at a tension of at least 0.2 cN/dtex, followed by a second step wherein the yarn is heated at a temperature of 370 to 500° C. at a tension of less than 1 cN/dtex. The invention further pertains to a multifilament aramid yarn spun from a sulfuric acid spin dope and having a tenacity of at least 2500 mN/tex.

10 Claims, No Drawings

METHOD FOR OBTAINING HIGH-TENACITY ARAMID YARN

The invention relates to a method for obtaining high-tenacity aramid yarn, wherein the yarn is a copolymer obtained from a mixture of monomers comprising DAPBI, an aromatic para-diamine, and an aromatic para-diacid, and wherein the yarn is heated in at least two process steps.

Methods of heat treating yarn of spun copolymer obtained from a mixture of monomers comprising DAPBI (5-(6)-amino-2-(p-aminophenyl)benzimidazole) and PPD (para-phenylene diamine) in a heating oven are known in the art. Typically, as-spun yarns are led through an oven at a temperature of about 450° C. The residence time of the yarn in the oven is controlled by the yarn speed and is usually set between 20 seconds and 5 minutes at controlled tensions between 0.2 and 1 cN/tex. Such method using a single heating step is for example known from CN 1473969. Methods of heat treating spun DAPBI-PPD copolymer yarn in two separate process steps are also known in the art. In the Russian patent RU 2017866 a two step heat treatment is disclosed. These polymers are subjected to a draw-out step up to 120 wt %, followed by wash and drying steps, followed by a heat treatment at 320 to 350° C., and a further drawing at 360 to 420° C. to 1-3 wt %. The first heat treatment step is carried out with the yarn on the bobbin by placing the bobbin in an oven for 30 minutes. In this method the yarn tension cannot be controlled and heat treatment times of the different layers of yarn on the bobbin will differ due to heat transport time through layers of yarn.

Thermal drawing was disclosed in Sugak et al., *Fibre Chemistry*, Vol. 31, No. 1, 1999. Heating was performed in a heating zone, and in addition the fibers were heated (at undisclosed temperature) when the samples were wound on spools. However, heating the yarns during the process of reeling-up will lead to an uncontrolled process which unfavorably contributes to the properties of the yarn. In RU 2045586 a similar process was disclosed wherein the filaments were reeled up, washed and dried, and as such heated at 350-370° C., and thereafter hot-drawn at 390-400° C. Yarns with high tenacity could be prepared, however, only with optimum amounts of DAPBI and Cl-PPD (2-chloro-p-phenylenediamine). Thus example 20 provides high tenacity yarn using 7.5 mole % DAPBI and 25 mole % Cl-PPD. RU 2045586 further teaches that any increase of DABPI content and/or any decrease of Cl-PPD content leads to decrease of tenacity. It was further found that tenacities of at least 2500 mN/tex could only be obtained in the presence of Cl-PPD (at least 20 mole %). It is stressed that using Cl-PPD and certainly higher amounts thereof, is less preferred because of the presence of chlorine since it may unfavorably affect the properties of the yarn when heat is used.

Again, the uncontrolled first heat treatment on the bobbin will unfavorably contribute to the final properties of yarn having high amounts of DABPI or low amounts of Cl-PPD.

It is therefore an objective of the present invention to provide a method that does not have the disadvantages of the known two-step heating processes, whereas the properties of the yarn having relatively higher amounts of DABPI and/or lower amounts of Cl-PPD are much better than as obtained by the conventional one-step method.

To this end the invention pertains to a method for obtaining high-tenacity aramid yarn, wherein the yarn is a copolymer obtained from a mixture of monomers comprising DAPBI, an aromatic para-diamine, and an aromatic para-diacid, wherein the running yarn is heated in at least two process steps, characterized in that in a first step the yarn is heated at a temperature of 200 to 360° C. at a tension of at least 0.2 cN/dtex, followed by a second step wherein the yarn is heated at a temperature of 370 to 500° C. at a tension of less than 1 cN/dtex.

The new method consists of two different heating steps in two heating zones, such as two sets of heating devices, such as ovens, or in one oven having a temperature gradient.

In the first step the yarn is pre-drawn to a tension that is as high as possible without disturbing the process. The temperature in this step is preferably kept at 240° C. to 330° C. The first step is preferably directly followed by a second drawing step at preferably 400° C. to 470° C. under low tension. Between the two steps there is preferably no winding and unwinding of the yarns. Preferably in both steps oxygen levels are kept below 0.5 wt %, preferably at about 0.25 wt %.

For optimum yarn properties it is important that no further process steps are performed between the two process steps. Thus for optimum results it is important that no winding and unwinding of the yarn occurs between the two process steps. The yarn is led through the heating zones usually at a rate leading to a heat residence time of at least 5 seconds, preferably at least 10 seconds, most preferably at least 20 seconds in both heating zones.

The yarn tension in the heating devices (such as ovens) is controlled by the draw ratio in the ovens. In the second step the tension is kept as low as possible without disturbing the transport of the yarn. In practice this is usually about 15 cN for a bundle of approximately 130 dtex.

For obtaining the best results, i.e. the highest tenacities, the process steps are performed under conditions wherein the tension is kept as constant as possible. This can, for instance, be obtained by keeping the yarn speed fluctuations as small as possible.

It is further advantageous to use copolymers having a $\eta_{rel}$ (relative viscosity) of at least 3.5. The relative viscosity can be measured by known methods, for instance as disclosed in EP1689805.

The monomers used for making the yarn of the invention comprise DAPBI, which stands for 5-(6)-amino-2-(p-aminophenyl)benzimidazole. The term "aromatic para-diacid" as used throughout this invention has the meaning aromatic para-diacid or derivative thereof. Usually the acid as such is not used as monomer for the polymerization reaction but an ester or halide thereof, more particularly the acid chloride is used.

The term "aromatic para-diamine" as used throughout this invention has the meaning aromatic para-diamine or derivative thereof. Examples are PPD, Cl-PPD, Me-PPD, MeO-PPD, and the like. Most preferably PPD and/or Cl-PPD are used. Although DAPBI is also an aromatic diamine, this compound is not included in the definition of "aromatic para-diamine".

The DAPBI-PPD copolymer is obtained by co-polymerizing the aromatic diamine monomer 5-(6)-amino-2-(p-aminophenyl)benzimidazole and the aromatic para-diamine monomer p-phenylene diamine (PPD), and the aromatic para-diacid derivative terephthaloyl dichloride (TDC). Although not required, part or all of the above para-aromatic monomers can be replaced by other para-aromatic monomers, for instance part or all of PPD can be replaced by PPD analogues, such as 2-chloro-p-phenylenediamine (Cl-PPD), and TDC can be partly or fully replaced by Cl-TDC (2-chloroterephthaloyl dichloride).

Particularly useful yarns for use in this method are as-spun yarns. As-spun yarns are yarns that are spun but did not undergo a heating treatment at 200° C or more. Particularly good results are also obtained for yarn (or as-spun yarn)

obtained from a sulfuric acid spin dope. Yarns obtained from a sulfuric acid spin dope have a sulfur content of at least 0.1 wt %. It is advantageous to use sulfuric acid spin dopes, since by using such spin dopes much higher spinning speeds can be obtained than when NMP- or DMAc-containing spin dopes are used. It is further preferred to have as low as possible hydrogen chloride contents in the yarn to prevent release of hydrogen chloride from the yarn. Hydrogen chloride contents lower than 0.5 wt % are preferred. Most preferred are yarns that are totally or virtually free from hydrogen chloride.

According to a preferred embodiment of the method the first process step is performed at 240 to 330° C. at a tension of at least 1 cN/dtex, preferably at least 3 cN/dtex. In principle, for obtaining the best results the tension is kept high during the first heat treatment. The highest possible tension is about 95 wt % of the breaking tension at the temperature applied. At higher tensions the yarn will break. To prevent any breakage it is preferred not to use tensions far above 90 wt % of the breaking tension at the temperature applied. Preferably the residence time used is mostly at least 20 seconds.

According to a preferred embodiment of the method the second process step is performed at 400 to 470° C. at a tension less than 0.2 cN/dtex. This tension is usually kept as low as possible. By using special equipment, such as a conveyor belt, tensions of as low as 0 cN/tex (i.e. no tension at all) can be achieved. The residence time is most preferably at least 20 seconds.

The highest increase of the tenacity in comparison with the conventional one-step method is obtained when the copolymer is made from a mixture of monomers wherein at least 12.5 mole %, preferably at least 17 mole % of the monomers is DAPBI. The copolymers can be prepared according to known methods, such as disclosed in U.S. Pat. No. 4,018,735 or WO 2005/054337.

The method according to this invention leads to aramid yarns having further improved tenacity. It was found that this method can lead to yarns having tenacity of approximately 200 mN/tex higher than conventionally produced yarns. It is therefore also an objective of the invention to provide a multifilament aramid yarn having a tenacity of at least 2500 mN/tex wherein the yarn is a copolymer obtained from a mixture of monomers comprising DAPBI, an aromatic para-diamine, and an aromatic para-diacid wherein at least 12.5 mole % of the monomers is DAPBI, less than 20 mole % is Cl-PPD, and wherein the yarn has a sulfur content of at least 0.1 wt %. Preferably the mixture comprises monomers wherein at least 17 mole % of the monomers is DAPBI. Such high-tenacity multifilament yarns spun from a sulfuric acid spin dope are not yet known. In another preferred embodiment the mixture only contains PPD as the aromatic para-diamine.

In an alternative embodiment according to the invention the multifilament aramid yarn has a tenacity of at least 2500 mN/tex wherein the yarn is made of a copolymer obtained from a mixture of monomers comprising DAPBI, an aromatic para-diacid, and an aromatic para-diamine which is exclusively PPD, wherein at least 12.5 mole % of the monomers is DAPBI, and wherein the yarn has a sulfur content of at least 0.1 wt %.

Preferably such multifilament aramid yarn has a tenacity of at least 2750, more preferably 2850 mN/tex. The multifilament yarn has at least 2 filaments. Most preferred multifilament yarns have at least 25 filaments. Monofilament yarns have been previously disclosed in U.S. Pat. No. 4,018,735 having tenacity 30 gpd (about 2650 mN/tex) for 10 mole % DAPBI (example 14) and 30.5 gpd (about 2690 mN/tex) for 25 mole % DAPBI (example 7). It should however, be born in mind that the tenacity in U.S. Pat. No. 4,018,735 was measured on the filaments, not on the yarn. These values therefore cannot directly be compared with the presently claimed values. According to the standard textbook *Kevlar Aramid Fiber*, by H. H. Yang ((John Wiley & Sons, 1993, pages 34-35) the tenacity of yarn is usually 80-85 wt % of the tenacity of a single filament. This factor should be kept in mind when comparing yarn properties with filament properties. Thus the filament values of U.S. Pat. No. 4,018,735 are in terms of the presently claimed yarn tenacities at the most about 2250 and 2290 mN/tex, respectively.

The invention is further illustrated by the following non-limitative examples.

General

The tenacity was measured according to the method described in ASTM D 885

The Na, S, Cl and Ca contents are determined by XRF as follows.

Sample Pretreatment

The sample was ground to a fine powder in a Herzog HMS 100 grinding mill with a tungsten carbide grinding vessel. The aramid powder was pressed to a 20 mm diameter tablet by a Fontijne TP 400 plate press at 175 kN pressure for 2 minutes.

XRF Measurement

This measurement was performed with a PW2400 Philips X-ray fluorescence spectrometer and aluminum sample holders for 20 mm tablets The following instrumental settings were applied:
X-ray tube: Chromium anode
Detector: Flow Counter for Ca, Cl, Na, S.
Filter: None.
Collimator mask: 16 mm
Medium: Vacuum The instrumental settings were as follows:

| Line | kV | mA | 2θ angle (°) | background offset (°) | $T_p$ (s) | $T_b$ (s) | Crystal | collimator μm | PHD-setting UL/LL wt % |
|---|---|---|---|---|---|---|---|---|---|
| Ca-Kα | 60 | 50 | 113.200 | +/−2.00 | 50 | 10 | LiF200 | 150 | 80/20 |
| Cl-Kα | 60 | 50 | 92.810 | +/−2.00 | 50 | 10 | Ge 111 | 550 | 70/30 |
| Na-Kα | 50 | 60 | 28.180 | +/−2.00 | 50 | 10 | PX1 | 700 | 80/20 |
| P-Kα | 60 | 50 | 140.994 | +/−1.60 | 50 | 10 | Ge 111 | 550 | 80/20 |
| S-Kα | 60 | 50 | 110.680 | +/−2.00 | 50 | 10 | Ge 111 | 550 | 80/20 |

The principle of quantification is based on a linear relationship of Na—, S—, Cl—, and Ca—Kα-fluorescence intensities with known concentrations to give a calibration line, which line is used to determine unknown concentrations.

EXAMPLE 1

(Comparative; One-Step Process)

A polymer obtained from a mixture of 25 mole % PPD and 25 mole % DABPI (and 50 mole % TDC) having $\eta_{rel}$ 6.0 was dissolved in 99.8 wt % sulfuric acid, as described in WO 2006/045517. Zone temperatures in the twin screw extruder were between 90 and 75° C. The polymer concentration in the solution was 20 wt %, and the solution was spun through 50 spinning holes of 75 micron. The spinneret assembly was kept at 125° C. The flow was drawn in an airgap and coagulated in water of 2° C. After washing 0.5 wt % NaOH in water was used as neutralizing fluid, and in a second washing step the neutralizing fluid was washed off. The yarn was dried at 160° C. and reeled up at 147 m/min to obtain as-spun yarns.

This yarn has a linear density of 148 dtex, a tenacity of 1305 mN/tex and a modulus of 65 GPa.

This yarn was submitted to drawing in an oven at temperatures ranging from 400 to 475° C. under nitrogen. The residence time in the oven was 28 seconds in all cases. During this drawing various tensions were applied; ranging from 0.17 cN/dtex to 2.53 cN/dtex, as a result of drawing ratios between 1.01 and 1.03. The properties and the essential machine settings are given in Table 1.

TABLE 1

| Tension in oven cN/dtex | T oven ° C. | Linear density dtex | Tenacity mN/tex | Elongation at break wt % | Modulus Gpa | Toughness J/g |
|---|---|---|---|---|---|---|
| Untreated yarn | | 148 | 1305 | 4.2 | 65 | 31 |
| 0.17 | 400 | 130 | 2065 | 2.80 | 122 | 31 |
| 1.40 | 400 | 130 | 1959 | 2.43 | 131 | 25 |
| 2.83 | 400 | 127 | 1759 | 2.07 | 135 | 20 |
| 0.19 | 425 | 130 | 2338 | 3.09 | 123 | 37 |
| 1.27 | 425 | 129 | 2108 | 2.56 | 131 | 28 |
| 2.53 | 425 | 128 | 1664 | 1.95 | 135 | 17 |
| 0.21 | 450 | 132 | 2468 | 3.16 | 124 | 40 |
| 1.16 | 450 | 131 | 2212 | 2.61 | 134 | 30 |
| 2.38 | 450 | 130 | 1687 | 1.93 | 136 | 17 |
| 0.27 | 475 | 131 | 2438 | 3.10 | 126 | 39 |
| 1.20 | 475 | 131 | 2030 | 2.44 | 131 | 26 |
| 2.26 | 475 | 129 | 1472 | 1.68 | 135 | 13 |

The highest tenacity is achieved at 450° C. using the lowest tension applied.

EXAMPLE 2

As-spun yarns were prepared as described in Example 1. The yarn was submitted to a two-step heat treatment procedure in which the first step was carried out at lower temperatures (300 to 360° C.) than the second step (450° C.), and lower than in Example 1, and wherein the tension applied on the yarns were higher in the first step than in the second step. Between the two steps the yarns were not reeled up, but transported by a godet that functions as a tension/speed control. Yarn tensions in the second step were between 0.25 and 0.29 cN/dtex. Residence time in both heating zones was 28 seconds.

The yarn properties and essential machine settings are given in Table 2.

TABLE 2

| Tension oven 1 cN/dtex | Tension oven 2 cN/dtex | oven 1 (° C.) | oven 2 (° C.) | Linear density dtex | Tenacity [mN/tex] | Elongation at Break [wt %] | Modulus [GPa] | Toughness [J/g] |
|---|---|---|---|---|---|---|---|---|
| as-spun yarn | | | | 153 | 1356 | 4.3 | 68 | 33 |
| 0.33 | 0.27 | 300 | 450 | 131 | 2603 | 3.3 | 124 | 43 |
| 1.63 | 0.26 | 300 | 450 | 131 | 2698 | 3.3 | 127 | 44 |
| 3.68 | 0.28 | 300 | 450 | 130 | 2770 | 3.3 | 129 | 46 |
| 0.24 | 0.29 | 330 | 450 | 130 | 2652 | 3.3 | 125 | 45 |
| 1.52 | 0.26 | 330 | 450 | 131 | 2698 | 3.3 | 128 | 45 |
| 3.40 | 0.25 | 330 | 450 | 131 | 2663 | 3.2 | 128 | 44 |
| 0.22 | 0.25 | 360 | 450 | 132 | 2601 | 3.4 | 122 | 45 |
| 1.44 | 0.26 | 360 | 450 | 132 | 2696 | 3.4 | 125 | 46 |
| 3.15 | 0.25 | 360 | 450 | 133 | 2656 | 3.3 | 126 | 44 |

EXAMPLE 3

As-spun yarns were prepared as described in Example 1. The temperature of the spinneret assembly was 91° C., the neutralization fluid had a NaOH concentration of 0.8 wt % and the winding speed was 140 m/min. The as spun yarn had a linear density of 147 dtex, a tenacity of 1451 mN/tex, a modulus of 62 GPa and a toughness of 35 J/g. The yarn was submitted to a two-step heat treatment procedure in which the first step was carried out at lower temperatures (260 to 300° C.) than the second step (450° C.). The temperature of the first step was also lower than the temperature of the first step in Example 2. The tensions applied on the yarns were higher in the first step than in the second step. Between the two steps the yarns were not reeled up, but transported by a godet that functions as a tension/speed control. Yarn tensions in the second step were 0.1 cN/dtex. Residence time in both heating zones was 28 seconds.

The yarn properties and essential machine settings are given in Table 3.

TABLE 3

| Tension oven 1 cN/dtex | Tension oven 2 cN/dtex | oven 1 (° C.) | oven 2 (° C.) | Linear density dtex | Tenacity [mN/tex] | Elongation at Break [wt %] | Modulus [GPa] | Toughness [J/g] |
|---|---|---|---|---|---|---|---|---|
| 0.52 | 0.1 | 260 | 450 | 134 | 2730 | 3.67 | 114.8 | 50.0 |
| 1.93 | 0.1 | | | 135 | 2720 | 3.64 | 116.6 | 49.8 |
| 4.22 | 0.1 | | | 132 | 2790 | 3.62 | 118 | 50.5 |
| 0.46 | 0.1 | 280 | 450 | 133 | 2640 | 3.59 | 114.3 | 47.7 |
| 1.83 | 0.1 | | | 134 | 2710 | 3.58 | 117.4 | 49 |
| 4.03 | 0.1 | | | 134 | 2740 | 3.61 | 118.5 | 49.6 |
| 0.36 | 0.1 | 300 | 450 | 136 | 2660 | 3.61 | 116.5 | 48.6 |
| 1.79 | 0.1 | | | 136 | 2600 | 3.6 | 113.8 | 48 |
| 3.99 | 0.1 | | | 137 | 2780 | 3.63 | 118.4 | 50.3 |

EXAMPLE 4

As-spun yarns were prepared according to Example 3, but the residence time in both heating zones was increased to 56 seconds.

The yarn properties and the most essential machine settings are given in Table 4.

TABLE 4

| Tension oven 1 cN/dtex | Tension oven 1 cN/dtex | oven 1 (° C.) | oven 2 (° C.) | Linear Density dtex | Tenacity [mN/tex] | Elongation at Break [wt %] | Modulus [GPa] | Toughness [J/g] |
|---|---|---|---|---|---|---|---|---|
| 0.42 | 0.1 | 300 | 450 | 135 | 2590 | 3.69 | 110.9 | 47.7 |
| 1.81 | 0.1 | | | 133 | 2720 | 3.66 | 114.9 | 49.6 |
| 4.06 | 0.1 | | | 132 | 2900 | 3.80 | 116.4 | 54.5 |

EXAMPLE 5

As-spun yarn was prepared as described in Example 3, except that the winding speed was 160 m/min. The as spun properties of this yarn were: linear density 133 dtex, tenacity 1579 mN/tex, modulus 72 Gpa, and toughness 37 J/g.

This as-spun yarn had an S content of 1.84 wt %, a Cl content of 154 ppm, a Na content of 0.06 wt %, and a Ca content of 22 ppm.

This as-spun yarn was heat treated according to Example 4.

Tension in the first oven was 4.47 cN/dtex and in the second oven 0.13 cN/dtex.

This resulted in a yarn with a linear density 114 dtex, tenacity 2998 mN/tex, modulus 127 GPa, and toughness 51.5 J/g.

This heat treated yarn had an S content of 1.88 wt %, a Cl content of 100 ppm, a Na content of 0.07 wt %, and a Ca content of 37 ppm.

EXAMPLE 6

A polymer obtained from a mixture of 40 mole % PPD and 10 mole % DABPI (and 50 mole % TDC) having $\eta_{rel}$ 6.7 was dissolved in 99.8 wt % sulfuric acid as described in WO 2006/045517. Zone temperatures in the twin screw extruder were 85° C. The polymer concentration in the solution was 19 wt %, and the solution was spun through 100 spinning holes of 70 micron. The spinneret assembly was kept at 90° C. The flow was drawn in an airgap and coagulated in water of 2° C. After washing 0.8 wt % NaOH in water was used as neutralizing fluid, and in a second washing step the neutralizing fluid was washed off. The yarn was dried at 160° C. and reeled up at 160 m/min to obtain as-spun yarns, and heat treated as in Example 3.

The most essential machine settings and the yarn properties are given in Table 5.

TABLE 5

| Tension oven 1 cN/dtex | oven 1 ° C. | Tension oven 2 cN/dtex | oven 2 ° C. | Linear density dtex | Breaking Tenacity [mN/tex] | Elongation at Break [wt %] | Modulus [GPa] | Toughness at Rupture [J/g] |
|---|---|---|---|---|---|---|---|---|
| As-spun properties | | | | 220 | 1915 | 4.6 | 75 | 45 |
| 1.79 | 300 | 0.12 | 450 | 199 | 2310 | 2.47 | 137.3 | 28.6 |
| 3.69 | 300 | 0.11 | 450 | 195 | 2400 | 2.51 | 139.3 | 30.1 |
| 5.48 | 300 | 0.15 | 450 | 196 | 2360 | 2.46 | 139 | 28.8 |

EXAMPLE 7

Yarns were spun according to Example 6 from polymers obtained from a mixture of 45 mole % PPD and 5 mole % DABPI (and 50 mole % TDC) having $\eta_{rel}$ 5.7, giving a linear density of 213 dtex, a tenacity of 2140 mN/tex and a modulus of 80 GPa. The most important machine settings and yarn properties are given in Table 6.

TABLE 6

| Tension oven 1 cN/dtex | oven 1 ° C. | Tension oven 2 cN/dtex | oven 2 ° C. | Linear density dtex | Breaking Tenacity [mN/tex] | Elongation at Break [wt %] | Modulus [GPa] | Toughness at Rupture [J/g] |
|---|---|---|---|---|---|---|---|---|
| 1.84 | 300 | 0.12 | 450 | 196 | 1990 | 2.19 | 129.8 | 21.8 |
| 2.64 | 300 | 0.12 | 450 | 194 | 2000 | 2.17 | 131.6 | 22 |
| 3.84 | 300 | 0.11 | 450 | 195 | 1950 | 2.11 | 132.0 | 20.4 |
| 5.18 | 300 | 0.10 | 450 | 193 | 2120 | 2.22 | 135 | 23.2 |

EXAMPLE 8

A polymer obtained from a mixture of 35 mole % PPD and 15 mole % DABPI (and 50 mole % TDC) having $\eta_{rel}$ 6.4 was dissolved in 99.8 wt % sulfuric acid as described in WO 2006/045517. Zone temperatures in the twin screw extruder were 85° C. The polymer concentration in the solution was 20 wt % and the solution was spun through 106 spinning holes of 75 micron. The spinneret assembly was kept at 85° C. The flow was drawn in an airgap and coagulated in water of 2.5° C. After washing 0.8 wt % NaOH in water was used as neutralizing fluid, and in a second washing step the neutralizing fluid was washed off. The yarn was dried at 160° C. and reeled up at 160 m/min to obtain as-spun yarns, and heat treated as in Example 3. Before heat treatment the as-spun yarn was pre-dried during 24 hours at 50° C.

The most essential machine settings and the yarn properties are given in Table 7.

TABLE 7

| Tension oven 1 cN/dtex | oven 1 ° C. | Tension oven 2 cN/dtex | oven 2 ° C. | Linear density dtex | Breaking Tenacity [mN/tex] | Elongation at Break [wt %] | Modulus [GPa] | Toughness at Rupture [J/g] |
|---|---|---|---|---|---|---|---|---|
| As-spun properties | | | | 190 | 1606 | 4.35 | 67.7 | 37.5 |
| 0.92 | 300 | 0.088 | 450 | 169 | 2590 | 3.01 | 131.1 | 39.1 |
| 1.79 | 300 | 0.082 | 450 | 170 | 2640 | 3.03 | 131 | 39.8 |
| 2.74 | 300 | 0.065 | 450 | 170 | 2720 | 3.04 | 134 | 41.2 |

The invention claimed is:

1. A method for obtaining high-tenacity aramid yarn, wherein the yarn has a tenacity of at least 2750 mN/tex and is made of a copolymer obtained from a mixture of monomers comprising at least 12.5 mole% DAPBI, an aromatic para-diamine, and an aromatic para-diacid, and the yarn is heated in at least two process steps, the process steps comprising:
a first step where the yarn is heated at a temperature of 200 to 360° C. at a tension of at least 0.2cN/dtex, followed by a second step where the yarn is heated at a temperature of 370 to 500° C. at a tension of less than 1 cN/dtex, wherein the tension in the first process step is higher than in the second process step.

2. The method according to claim 1, wherein the yarn after the first process step is directly led to a heating device for performing the second process step without winding and unwinding the yarn between the two process steps.

3. The method according to claim 1, wherein the yarn is as-spun yarn.

4. The method according to claim 1, wherein the yarn is spun from a sulfuric acid spin dope.

5. The method according to claim 1, wherein the first process step is performed at 240 to 330 ° C. at a tension of at least 1 cN/dtex.

6. The method according to claim 1, wherein the second process step is performed at 400 to 470 ° C. at a tension less than 0.5 cN/dtex.

7. The method according to claim 1, wherein the heating residence times of the two process steps are at least 10 seconds.

8. The method according to claim 7, wherein the copolymer is obtained from a mixture of monomers further comprising TDC and/or Cl-TDC, and PPD and/or Cl-PPD.

9. The method according to claim 1, wherein the first process step is performed at a tension of at least 3 cN/dtex.

10. The method according to claim 1, wherein the second process step is performed at a tension of less than 0.2 cN/dtex.

* * * * *

UNITED STATES PATENT AND TRADEMARK OFFICE
CERTIFICATE OF CORRECTION

PATENT NO. : 8,501,071 B2  
APPLICATION NO. : 12/311654  
DATED : August 6, 2013  
INVENTOR(S) : Hanneke Boerstoel et al.

Page 1 of 1

It is certified that error appears in the above-identified patent and that said Letters Patent is hereby corrected as shown below:

In the Claims:

In Column 10, please amend the claims as follows:

Claim 1, line 39, please change "200to 360° C " to --200 to 360° C.--;

Claim 1, line 39, please change " 02cN/dtex," to --0.2 cN/dtex.--;

Claim 1, line 41, please change "370to 500° C." to --370 to 550° C.--;

Claim 5, line 52, please change "240to 330 ° C" to --at 240 to 330 ° C--;

Claim 6, line 55, please change "400to 470 ° C" to --at 400 to 470 ° C--; and

Claim 8, line 62, please change "and/or CI-TDC," to --and/or CI-TDC--.

Signed and Sealed this  
Eighth Day of October, 2013

Teresa Stanek Rea  
*Deputy Director of the United States Patent and Trademark Office*